[Patent 2,965,617 — Dec. 20, 1960]

2,965,617

INTERPOLYMERS OF VINYL ESTERS WITH LONG CHAIN ALKYL ESTERS OF MALEIC ACID

Angus N. MacDonald, Indian Orchard, Mass., assignor to Shawinigan Resins Corporation, Springfield, Mass., a corporation of Massachusetts No Drawing. Filed Dec. 29, 1955, Ser. No. 556,097

1 Claim. (Cl. 260—78.5)

This invention relates to the interpolymerization of vinyl esters with alkyl esters of unsaturated dibasic acids and to products obtained thereby.

It is known to copolymerize vinyl esters with maleic anhydride and with short chain alkyl esters of maleic acid. In the past, these products have usually been produced from substantially equal molar amounts of vinyl ester and the maleic derivative, the polymer chains consisting of alternate units of vinyl ester and maleic groups. Products prepared by copolymerizing more than one mol of vinyl ester with one mol of maleic derivative have consisted essentially of heterogeneous polymer mixes. These mixes contain (a) some vinyl ester homopolymers and chains composed substantially of vinyl ester units, (b) a majority of chains with substantially alternate units for part of the chain and then a segment of consecutive vinyl ester units, and (c) other chains composed substantially of alternate units. The greater the excess of vinyl ester used, the greater the respective proportions of (a) to (b) and (b) to (c). Copolymerization with an excess of maleic derivatives presents similar difficulties and will result in unreacted maleic groups in proportion to the excess used, since these are extremely difficult to polymerize with each other. These problems are greatly accentuated as the number of carbons in the ester groups of the maleic ester is increased, since the presence of longer esters in the maleic molecule hinders its reactivity in copolymerization systems.

The term interpolymers is used herein to refer to substantially uniform or homogeneous copolymers, interpolymerization being the process of preparing such copolymers. This terminology is recommended by Calvin E. Schildknecht in "Vinyl and Related Polymers," pp. 50–52, copyright 1952, John Wiley and Sons, Inc.

It is an object of this invention to provide a method of interpolymerizing vinyl esters with long chain partial alkyl esters of maleic acid. Another object is to provide a method of interpolymerizing more than 1 mol of vinyl ester with 1 mol of long chain partial alkyl esters of maleic acid.

It is a further object of this invention to provide interpolymers of vinyl esters with maleic acid which has been partially esterified with aliphatic alcohols containing from 10 to 22 carbon atoms, the mol ratio of vinyl ester to maleic acid partial ester varying from 1:1 to 5:1 in said interpolymers.

These and other objects are obtained by adding 1 to 5 mols of a vinyl ester to 1 mol of partial alkyl esters of maleic acid in a continuous or semi-continuous manner throughout the polymerization period in an organic solvent for the monomers and the interpolymer produced and in the presence of a polymerization catalyst, while maintaining the temperature of the solution at 50 to 100° C., the partial esters of maleic acid consisting of 0.25 to 1.8 mols of alkyl groups per mol of maleic group.

The following examples are given in illustration and not in limitation of the invention. Where parts are given they are parts by weight.

Example I

These interpolymers can be prepared in conventional polymerization equipment. For example, the following composition was prepared in a 50-gallon glass-lined jacketed polymerization kettle fitted with an agitator and a reflux condenser.

Ninety-eight parts of maleic anhydride were added to the kettle. The jacket temperature was raised to 75° C. to melt the maleic anhydride. Thereafter, 278 parts of octadecyl alcohol were slowly added over a period of 1½ hours during which time the batch temperature was raised to 110° C. The mono-alkyl ester of maleic acid produced was the reaction product of equal molar parts of the alcohol and the maleic anhydride. The esterification being an equilibrium reaction, a slight excess of the alcohol was used to insure the formation of a full half ester. The mono-octadecyl maleate is a solid, white material with a melting point at 69° C. and readily soluble in benzene at temperatures above 60° C.

The charge was then cooled to the reflux temperature of benzene and 750 parts of benzene were added, followed by 7.5 parts of benzoyl peroxide.

One hundred and twenty-nine parts of vinyl acetate were then added in a very slow stream so that the addition time was 5 hours. Reflux temperature at atmospheric pressure was maintained all during the addition. When all the vinyl acetate had been added, heating was continued for another hour to insure complete reaction. The product was a benzene solution of a vinyl acetate-mono-octadecyl maleate interpolymer in the ratio of 1.3 mols of vinyl acetate per mol of partial maleic ester. The solution had a pale yellow color.

A 2% solution of this interpolymer in benzene had a viscosity of 0.77 centipoise at 20° C. The interpolymer may be separated from the benzene solution by steam distillation, or the resin may first be precipitated out by the addition of a non-solvent such as water, centrifuged and then dried by conventional means. The dry interpolymer obtained is a solid, white, waxy resin soluble in hexane, alcohol-toluene, and alcohol-benzene as well as benzene. The softening temperature of the resin by the ball and ring method is 105° C.

Example II

This example is the same as Example I except that 2 mols of vinyl acetate were interpolymerized with the mixture obtained by reacting 0.75 mol of normal dodecyl alcohol with 1 mol of maleic anhydride. The acetate addition time was 4 hours and heating of the solution was continued 15 minutes after the addition was completed. The ratio of total monomer to benzene was 100 parts to 167. The product was a benzene solution of an interpolymer of vinyl acetate, mono-dodecyl maleate and maleic anhydride. The molar ratio of the maleate to the anhydride was substantially 3:1. A 2% solution of the resin in benzene had a viscosity of 1.19 centipoises at 20° C.

Example III

Another interpolymer was prepared in a manner similar to Example I. The maleic ester was the reaction product of 1.5 mols of cetyl alcohol with 1 mol of maleic anhydride. The molar ratio of vinyl acetate to maleic ester was 3:1 and 100 parts of total monomers were used to 250 parts of benzene. The polymerization catalyst used was lauroyl peroxide (0.6 part per 100 parts of total monomer). 5% of this catalyst was dissolved in the solution of maleic ester before the vinyl acetate addition, and the remainder was dissolved in the vinyl acetate. The vinyl acetate was gradually added throughout 3.5 hours of polymerization, heating being continued for an additional ½ hour. The solution of the vinyl acetate-cetyl maleate interpolymer produced when diluted with additional benzene to a 2% concentration had a viscosity of 1.10 centipoises at 20° C. The cetyl maleate portion of the polymer consisted substantially of monocetyl maleate and dicetyl maleate in a molar ratio of 1:1.

The homogeneity of the interpolymers produced above was determined by examining for fractions having a different chemical analysis from the bulk of the material. A sensitive test was developed to detect very small amounts of vinyl acetate homopolymers and long segments of polyvinyl acetate in copolymers of vinyl acetate with maleic esters. The addition of 3 parts of hexane to 2 parts of a 4% solution of these resins in benzene produces a turbid solution if the homopolymer vinyl acetate content is 0.05% or more of the weight of the resin. This test applies to polymer chains having at least 9 vinyl acetate units per unit of maleic ester as well as to homopolymer vinyl acetate. The interpolymers prepared in the above examples were tested by this method. None produced a turbid solution, indicating that each interpolymer had a total of less than 0.05% of polymers consisting substantially of vinyl acetate, that is, vinyl acetate homopolymers and polymer chains with a ratio of vinyl acetate units to maleic units of at least 9 to 1. The concentration of greater percentages of vinyl acetate polymer chains in these resins may be determined by the use of a decreased amount of hexane in the test.

Examples II and III were repeated in an identical manner, but the addition time of the vinyl acetate was shortened by 30%. The products formed by the more rapid addition produced a turbid solution on being tested by this method.

Another test for measuring the homogeneity of interpolymers of this type is to measure the methanol extractables. The resins produced in Examples I and III showed less than 8% extractables by weight of the resin. The resin of Example II had 10% methanol extractables. The extracted materials are largely a mixture of alcohol, unreacted maleate (if any), polymer chains consisting of vinyl acetate and maleic anhydride, polyvinyl acetate and polymer chains containing an excessive proportion of vinyl acetate units. The proportion of vinyl acetate units required to render a polymer extractable varies with the maleic compounds present. In general, copolymers having about 7 or more vinyl acetate units per unit of maleic ester will be extracted. Products prepared as in the examples above, but with the vinyl acetate addition time reduced by 50%, all had methanol extractables of over 20%.

Interpolymers of vinyl acetate and alkyl maleates of this invention contain, by weight of the interpolymer, not more than 0.2% of substantially homopolymer vinyl ester chains and not more than 20% methanol extractables, as determined by the above tests.

To produce substantially homogeneous copolymers by this invention, the gradual addition of the vinyl ester should be extended over almost the full time required to interpolymerize the type and proportion of vinyl and maleic esters used. A small proportion of vinyl ester may be added before the polymerization is started. A supplementary heating time equal to less than 15% of the addition time will usually be more than sufficient to react all the maleate. Since polymerization reactivity of the monomers may be affected by different types or amounts of catalyst, temperatures or pressures, and the solvent used, the addition rates will vary with differing sets of conditions. Depending on these factors, addition times may be required ranging from about 2 to 20 hours. Homogeneous copolymers have been prepared in benzene at the solution reflux temperature with addition times between 2 and 11 hours. The interpolymerization of 1 to 5 mols of vinyl acetate with 1 mol of a mono-alkyl maleate in benzene at reflux temperature has required addition times ranging from 2 to 9 hours.

A catalyst soluble in an organic solvent is preferred. The catalyst used may be a peroxy compound such as benzoyl peroxide, lauroyl peroxide, ditertiary butyl peroxide, or acetyl peroxide. It may be added at the start or in a continuous or semi-continuous manner, less catalyst being required if the catalyst is delayed. At least a portion of the catalyst should be added to the solution before the first addition of the vinyl esters. In general, small amounts are sufficient and usually the amount of catalyst used is equal to 0.05 to 4% by weight of the monomeric compounds to be copolymerized.

It is preferred to run the reaction at the reflux temperature of the solution at atmospheric pressure. However, the peroxy type catalysts used require a polymerization temperature of at least 50° C. but not more than about 100° C. Mixing of the materials during the polymerization is desirable, but the agitation produced by the reflux action is often sufficient.

Copolymers may be prepared by adding the vinyl acetate in a delayed manner to bulk or suspension polymerization systems, but these are not as homogeneous as those prepared in a solvent system. A solvent system also results in products of more uniform molecular weights. In addition, the use of a solvent results in a lower working viscosity during polymerization than in bulk. Benzene, toluene, xylene, hexane, ethyl acetate and other inert organic solvents or mixtures of solvents for the monomers and interpolymers are suitable. The proportion of solvent to monomers used may be varied. 100 to 400 parts of solvent per 100 parts of monomer by weight are preferred.

Vinyl esters of lower aliphatic acids containing 2–6 carbon atoms may be used in this method. Examples of these esters are vinyl acetate, vinyl propionate, vinyl butyrate, vinyl valerate, vinyl hexoate and mixtures thereof. Vinyl acetate is preferred because of general availability and low cost.

Maleic acid is only one of a number of monoethylenic unsaturated dicarboxylic acids, such as fumaric, citraconic, mesaconic and itaconic acids, which may be used to form the ester comonomers.

This interpolymerization may be carried out with a variety of maleic esters. The alkyl esters of maleic acid may be prepared by any of the well-known methods. Partial alkyl maleates are usually prepared by reacting maleic anhydride with an alkyl alcohol. The invention is used in preparing interpolymers with maleic esters prepared from alcohols containing 6 to 25 carbon atoms or mixtures of such alcohols. The method is most advantageously applied to the interpolymerization of vinyl esters with maleates having alkyl groups of at least 10 to 22 carbons. Cyclohexyl maleates, benzoyl maleates and other cyclic maleates containing 10 to 22 carbon atoms in the ester group may also be used in the preparation of substantially homogeneous copolymers by this process.

This process is particularly applicable to the interpolymerization of maleates consisting of at least 0.25 mol of alkyl groups per mol of maleic group. However, the formation of interpolymers of vinyl esters with alkyl maleates becomes increasingly difficult as the number of carbon atoms in the alkyl groups is increased. It is therefore preferred that no more than 90% of the maleic acid groups be esterified (1.8 mols of alkyl groups per mol of maleic group) if the alkyl groups contain more than 10 carbon atoms. Three types of interpolymers are made by this invention depending on the molar amount of alkyl groups per mol of maleic group in the alkyl maleates. These interpolymers consist of vinyl esters with (1) mono-alkyl maleates, (2) mono-alkyl maleates and maleic acid or anhydride, or (3) mono-alkyl maleates and di-alkyl maleates.

This method solves the problem of interpolymerizing maleic esters with a molar excess of vinyl ester. The difficulty of interpolymerizing increases as the molar excess of vinyl ester used increases. When the ratio of vinyl ester to maleic ester exceeds 6 to 1, the production of a heterogeneous polymer mix is favored over an interpolymer. It is therefore advisable to use not more than 5 mols of vinyl ester per mol of maleic ester to insure the production of substantially homogeneous copolymers.

The production of similar products by copolymerizing vinyl acetate with maleic anhydride and post-esterifying with alkyl alcohols having at least 8 carbon atoms is extremely difficult. Some attempts at esterification resulted in a gel; other reactions gave evidence of polymer degradation and none of the products were completely soluble in benzene. In any event, this method will not produce interpolymers containing a molar excess of vinyl acetate, since vinyl acetate and maleic anhydride only form alternate unit (1:1 molar) interpolymers.

It is not believed that the distribution of the maleic ester is absolutely uniform in each polymer chain nor that the various polymer chains produced are identical. However, the interpolymers of this invention possess an unexpected degree of homogeneity. The characteristics of these interpolymers are more readily predictable, and the behavior of any interpolymer under similar circumstances is more uniform than that of products prepared by prior methods. The resistance of these materials to fractionation by various solvents should prove valuable under a variety of conditions.

The interpolymers prepared in this invention are useful as adhesives and coatings. Their resistance to water depends on the extent of esterification of the maleic acid used and the proportion of these maleates present. These resins may also be used as low adhesion coatings in pressure-sensitive adhesive tapes and liners when limited to a maleic ester consisting of 0.5 to 1.5 mols of alkyl groups per mol of maleic group. The use of these low adhesion coatings is disclosed in a copending application, Serial No. 410,452, filed February 15, 1954, by R. N. Crozier et al.

Although certain specific embodiments are set forth herein for purposes of illustration, it will be evident to those skilled in the art that the invention is capable of various modifications and adaptions within the spirit and scope of the invention.

What is claimed is:

In a process for interpolymerizing vinyl acetate with partial alkyl esters of maleic acid, said partial esters consisting of .75 to 1.5 mols of alkyl groups per mol of maleic acid moiety, said alkyl groups containing from 12 to 18 carbon atoms, to obtain substantially homogeneous interpolymers with a ratio of 1.1 to 5 mols vinyl acetate per mol maleic acid partial ester, said process being carried out in the presence of a polymerization catalyst, the steps of dissolving the maleic partial ester in an organic solvent for both the monomers and for the resulting interpolymer, the total amount of solvent being 100 to 400 parts solvent per 100 parts of total monomer, adding at least a portion of the catalyst to the solutions thus formed and then adding the vinyl acetate gradually over a period from 2 to 20 hours at a rate not to exceed the interpolymerization rate for the 1.1 to 5 molar proportion vinyl acetate to 1 molar proportion partial alkyl ester of maleic acid used, while maintaining the solution at 50 to 100° C.; said interpolymer containing no more than about 0.2% by weight of homopolymers of vinyl acetate, forming a clear solution when 3 parts hexane are added to 2 parts of a 4% solution of the interpolymer in benzene and said interpolymer containing no more than 10% methanol extractibles.

References Cited in the file of this patent

UNITED STATES PATENTS

| | | |
|---|---|---|
| 2,168,535 | Nuesslein et al. | Aug. 8, 1939 |
| 2,454,284 | Kirk | Nov. 23, 1948 |
| 2,522,775 | Bryant | Sept. 19, 1950 |
| 2,616,851 | Giammaria | Nov. 4, 1952 |
| 2,637,712 | Upton | May 5, 1953 |
| 2,643,238 | Crozier et al. | June 23, 1953 |
| 2,643,245 | Wilson | June 23, 1953 |
| 2,666,746 | Munday et al. | Jan. 19, 1954 |
| 2,744,098 | Towne | May 1, 1956 |